United States Patent [19]
Rose

[11] Patent Number: 5,457,466
[45] Date of Patent: Oct. 10, 1995

[54] EMITTER AZIMUTH AND ELEVATION DIRECTION FINDING USING ONLY LINEAR INTERFEROMETER ARRAYS

[75] Inventor: Conrad M. Rose, Dahlgren, Va.

[73] Assignee: Litton Systems Inc., Woodland Hills, Calif.

[21] Appl. No.: 117,534

[22] Filed: Sep. 7, 1993

[51] Int. Cl.[6] .................................................. G01S 5/04
[52] U.S. Cl. ..................... 342/442; 342/445; 342/424
[58] Field of Search .................................. 342/442, 445, 342/424

[56] References Cited

U.S. PATENT DOCUMENTS 3,631,496  12/1971  Fink et al. .
3,852,754  12/1974  Worrell .

Primary Examiner—Theodore M. Blum
Attorney, Agent, or Firm—Gerald L. Lett

[57] ABSTRACT

The invention provides a method for using single linear arrays for making AOA measurements only in sensor coordinates to perform emitter direction finding from an observing aircraft.

7 Claims, 6 Drawing Sheets

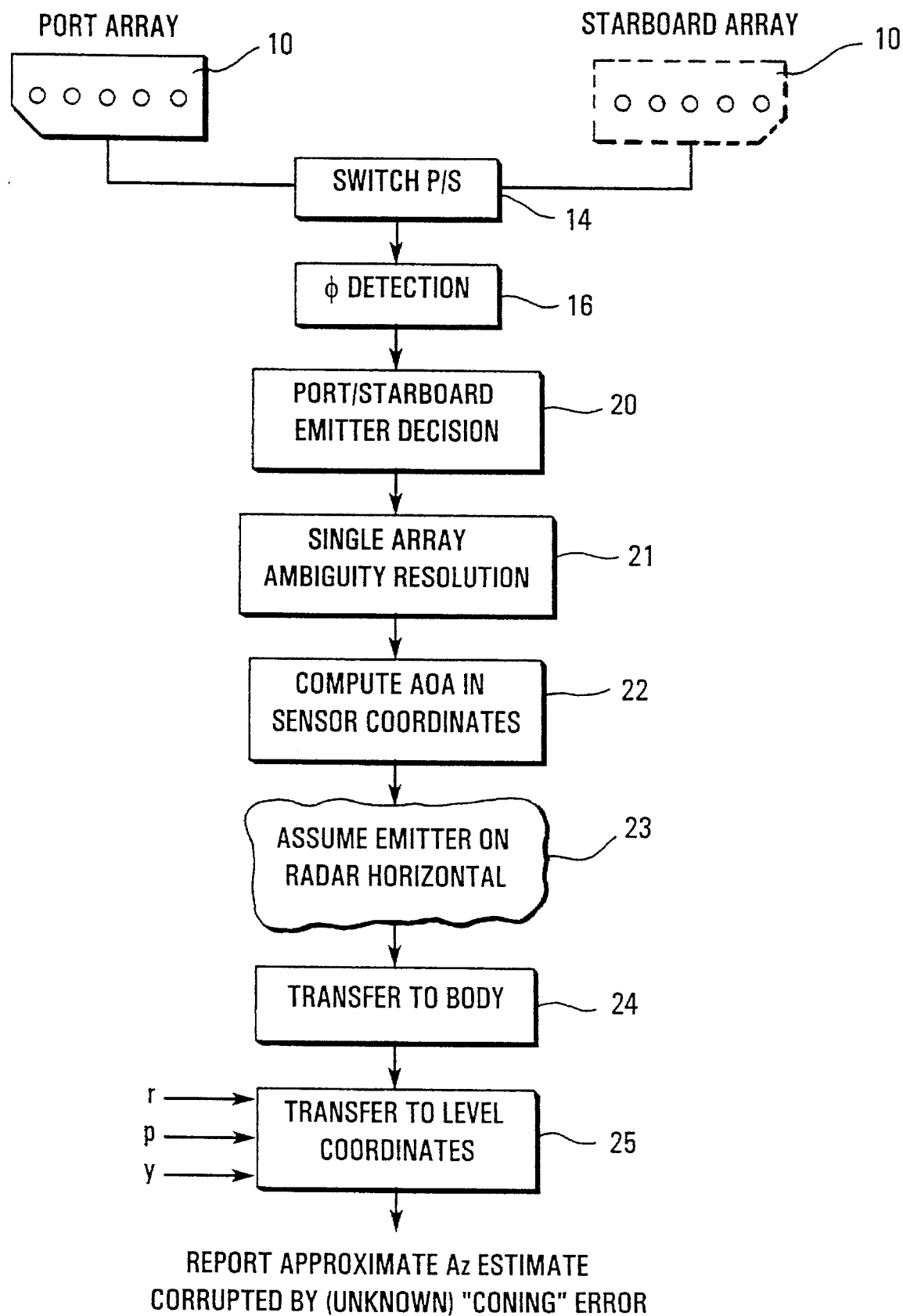

SNAP ROLL DISPERSIVE PHASE ERRORS

BASELINE (1-5 RIGHT ARRAY, 6-10 LEFT ARRAY)

DIVING TURN DISPERSIVE ERRORS

BASELINE (1-5 RIGHT ARRAY, 16-30 LEFT ARRAY)

EMITTER AZIMUTH AND ELEVATION DIRECTION FINDING USING ONLY LINEAR INTERFEROMETER ARRAYS

FIELD OF THE INVENTION

This invention relates to a means and method for measuring angle of arrival (AOA) to perform emitter direction finding (DF). In particular this invention provides a technique for making such measurements using linear interferometer arrays only.

BACKGROUND OF INVENTION AND RELATED ART

Passive radar emitter direction-finding (DF) utilizing radio frequency (RF) interferometers mounted on aircraft requires finding the emitter's azimuth and elevation in the observer's local-level reference frame. In the description given hereinafter the term aircraft is meant to encompass any observational platform whose motion involves attitudinal changes, such as roll, pitch and yaw, as well as translational motion. In particular, an interferometer sensor array mounted on the leading edge of an airplane wing measures AOA in relation to the sensor's own system of three dimensional coordinates which are then transformed to the observational body's frame of coordinates and a level frame of coordinates to report azimuth and elevation. Finally target location is reported in a set of coordinates for the Earth.

Finding emitter elevation and azimuth from aircraft has previously required the use of planar or conformal interferometer arrays. A linear interferometer could not be used, since a single linear array measures angle-of-arrival (AOA) and not direction-of-arrival (DOA). That is, a single linear interferometer produces an AOA cone, and the emitter can be anywhere on the intersection of that cone with the Earth.

A linear interferometer designed to fit on the leading edge of an aircraft wing, is illustrated in FIGS. 1a and 1b. FIG. 1a illustrates a typical prior art linear interferometer array 10 having a plurality of antennas or sensors 12 arranged as shown to have a baseline |d|. In FIG. 1b array 10 supplies through SPST switch 14 received radar signals to phase detector/receiver 16. The phase information from the receiver is supplied to a processor 18 which accomplishes phase ambiguity resolution; the phase-resolved signal 15 is then used for determination of AOA information, as shown at 19. The phase measurement of a plane wave with unit normal (DOA vector) $\vec{u}$ across one baseline $\vec{d}$ is $$\phi_m = \frac{2\pi}{\lambda} d \cdot u \qquad (1)$$
$$= \frac{2\pi}{\lambda} |d|\cos(AOA)$$

Thus the quantity measured is the angle of arrival, or AOA between the interferometer baseline and wavefront. Any emitter lying on the AOA cone will produce the same measured phase $\phi_m$. For a planar earth approximation, this means that any emitter lying on the hyperbola resulting from the intersection of the AOA cone with the earth can generate the same AOA, and hence emitter azimuth is available from this single measurement only in the special circumstance that the emitter lies in the plane containing the linear array baseline. When this is not true an ad hoc assumption about emitter elevation must be made, typically that the emitter lies on the radar horizon. For emitters not on the horizon the error in using AOA as the true azimuth measurement, typically called the "coning" error, is given by $$\sigma_{az} = \frac{\sigma_{AOA}}{\cos(e)} . \qquad (2)$$

This equation is strictly only true for the sensor coordinates but this caveat is not important here. Equation 2 indicates the azimuth error becomes quite large when emitters are at steep elevations. It is negligible for emitters on the horizon if the aircraft is flying level, but may become important even for distant emitters when the aircraft has a significant roll or pitch attitude.

Since emitter azimuth is an important parameter in many systems performing passive radar detection, e.g. for emitter classification and identification, this coning error is a severe drawback. Another deficiency AOA-only systems suffer is their lack of elevation measurement prevents "az/el" emitter location, i.e. finding emitter range r using phase measurements made in a single dwell along with the observer altitude h via a relationship such as $$r = \frac{h}{\sin(e)} \qquad (3)$$

However linear interferometer systems do perform location using bearings-only passive location techniques. Bearings-only ranging utilizing AOA essentially finds the intersection of the multiple AOA-hyperbola generated as the aircraft moves along its track. The accuracy of any such AOA-only location technique is characterized by a "geometric" signal-to-noise ratio or gSNR $$\frac{\sigma_{az}}{\Delta B} \qquad (4)$$

where $\Delta B$ is the bearing spread at the emitter created by the observer's motion, and $\sigma_{az}$ is equivalent to $\sigma_{AOA}$ (for the purpose of characterizing bearings-only accuracy) when the aircraft flight is essentially straight and level.

Thus a positive feature of bearings-only ranging is that the range accuracy can be improved by making the bearing spread larger. This is in marked contrast to az/el location. Az/el location estimates cannot be refined by sequential averaging because of the large bias errors typically present in the elevation measurement. These elevation errors can have a significant DOA dependent component, and since an important application of az/el ranging is to locate emitters near the observer flight path, the DOA may not change significantly. DOA dependent bias error is also present on the bearings-only measurement, but has a negligible effect for emitters at bearings essentially normal to the observer's flight path, which is often the case when AOA-only location is used.

FIG. 2 (described below) summarizes the operation of an AOA-only system. This system, as in FIG. 1b, supplies phase information from receiver/phase detector 16 through switch 20 to processor 21 which provides ambiguity resolution for each of the arrays 10. The resolved baseline information is then used at 22 to compute AOA information in accordance with the sensor's set of coordinates. After a range estimate is supplied at 23, the AOA information is calculated in accordance with the platform or body's set of coordinates at 24, and then to level coordinates at 25.

The benefits of using a single linear array doing bearings only ranging are the limited number of phase measurements required per dwell compared to multi-dimensional arrays, and compact installation. The drawbacks are the inability to go from AOA in the sensor frame to azimuth in the level frame without assuming an ad hoc emitter elevation, i.e. introducing an unknown and possibly large coning error, and the lack of any elevation measurement to use in rapidly estimating emitter range, particularly for emitters close to the aircraft.

Overcoming these drawbacks and providing accurate azimuth has previously required utilizing an interferometer array extending in at least two dimensions, such as the conventional conformal array. In the latter array it is necessary to use a vertically disposed sensor array to form an elevation baseline while another sensor array generally disposed horizontally is used to resolve the elevation array ambiguities.

The phase measurements in such a multi-baseline system cannot typically be made without receiver switching between the baselines, i.e. on a nonmonpulse basis. Besides increasing system complexity, such baseline switching complicates the detection of multipath errors on the phase measurements.

There are other problems with switching. In the conformal array discussed above the horizontal array must have its phase measurements completed before making phase measurements on the elevation antennas. If the emitter is no longer detected after the "horizontal" phase measurements are made, because, for example, of emitter scanning or terrain blockage, elevation will not be obtained.

Note that the possibility of not getting a full set of phase measurements is increased by the use of elevation arrays on low RCS (Radar Cross Section) aircraft, since stealth aircraft impose RCS restrictions on the antennas. Adding an elevation array increases the overall RCS, requiring antenna design trade-offs that reduce system sensitivity and hence may prevent detecting emitter side and backlobes.

Obtaining the space to mount a planar array or three dimensional array is difficult on many smaller aircraft. Also, important delta-wing stealth aircraft designs do not provide extensive vertical area, and hence little space for a planar array no matter what the intrinsic aircraft size. Although by utilizing conformal design techniques elevation arrays can be mounted on the leading edge of delta-wing aircraft, the antenna elements do not have common boresights. This can introduce significant bias errors, especially when certain popular ESM system antenna elements, such as broadband multi-arm spirals are used.

A positive aspect of multidimensional arrays is that, aside from the time required for baseline switching during a dwell, az/el location provides near monopulse emitter location. But this very desirable feature is mitigated by the following deficiency:

The 1-σ accuracy of az/el location is characterized by a "geometric" signal-to-noise ratio (gSNR)

$$\cot(e)\sigma_e \qquad (5)$$

Thus the estimate is intrinsically inaccurate at lower altitudes and at any altitude for emitters near the horizon, with no means of subsequent refinement, i.e. no bearing spread factor as for sequential AOA location.

Because of multi-dimensional array installation limitations, baseline switching-induced system complexity, and intrinsic inaccuracy of az/el ranging, linear interferometer arrays measuring AOA-only have been used extensively in ESM systems. Flight tested linear interferometers working over emitter frequencies from 2 GHz to 18 GHz, such as those designed by the Amecom Division of Litton Systems, Inc. for the TEREC system and an advanced capability receiver for the EA6-B program are readily available. But, as noted above such arrays do not provide true emitter azimuth or monopulse location.

It is therefore, an object of this invention to allow such linear arrays to be used to perform the functions associated with more complex multi-dimensional arrays, i.e generate azimuth, elevation, and emitter range in a manner that does not involve flying a base leg to produce bearing spread.

It is the further object of this invention to allow emitter location by multiple platforms collocated, as in a formation, and to remove the defects associated with conventional az/el location by converting systematic bias errors to errors random in time, thus allowing improvement of the az/el range estimate by sequential averaging.

SUMMARY OF THE INVENTION

The foregoing objects, and others, are achieved in accordance with the invention which provides a method for using single linear arrays for making AOA measurements only in sensor coordinates to perform emitter direction finding from an observing aircraft. The linear arrays used may be mounted on a single or on multiple aircraft. Since emitter elevation information is generated, az/el ranging can be accomplished using only a linear interferometer, instead of two or three dimensional sensor arrays.

This invention allows aircraft not fitted with elevation arrays to generate true azimuth and elevation, and to do az/el location with significantly greater accuracy at low altitudes than currently done.

Thus it is the purpose of this invention to utilize linear interferometer arrays to:

1.) Generate the DOA unit vector $$\vec{u} = \cos(e)\cos(a)\vec{i} + \cos(e)\sin(a)\vec{j} - \sin(e)\vec{k} \qquad (6)$$

to provide azimuth with no coning error for sorting and other electronic security measures ESM uses and elevation for location.

2.) Derive elevation from phase measurements in a way that allows sequential averaging to reduce az/el range estimate errors.

3.) Provide elevation baselines that can be as long as those commonly used for azimuth measurement on aircraft with limited vertical aperture.

When two or more platforms are used, monopulse phase measurements from each platform are utilized to DF and az/el locate the emitter. The measurements from the multiple platforms require no time-simultaneity. In fact, the time at which the measurement is made is not used at all, but instead only the platforms' locations and attitudes. The origin of the phase measurements, i.e. whether single platform or multi-platform, is immaterial to the new invention.

A significant element of the new invention is the generation of a virtual spatial array from the linear arrays based on aircraft six-degree-of-freedom, or 6DOF, motion. 6DOF refers to the six parameters required to specify the position and orientation of a rigid body. The baselines at different times are assumed to generate AOA cones all having a common origin; the intersection of these cones gives the emitter DOA, from which az/el range can be derived.

The generation and intersection of the AOA cones can be done in seconds, as opposed to the conventional multicone AOA approach, bearings-only passive ranging, discussed above. Bearings-only passive ranging requires that the origin of the cones be separated by some intrinsic flight path length in order to form a triangle, and subtend bearing spread at the emitter.

BRIEF DESCRIPTION OF THE DRAWINGS

FIG. 2 is a functional/schematic diagram of a multi-linear array conventional AOA-only measurement system.

DETAILED DESCRIPTION OF A PREFERRED EMBODIMENT

Figure 3A:
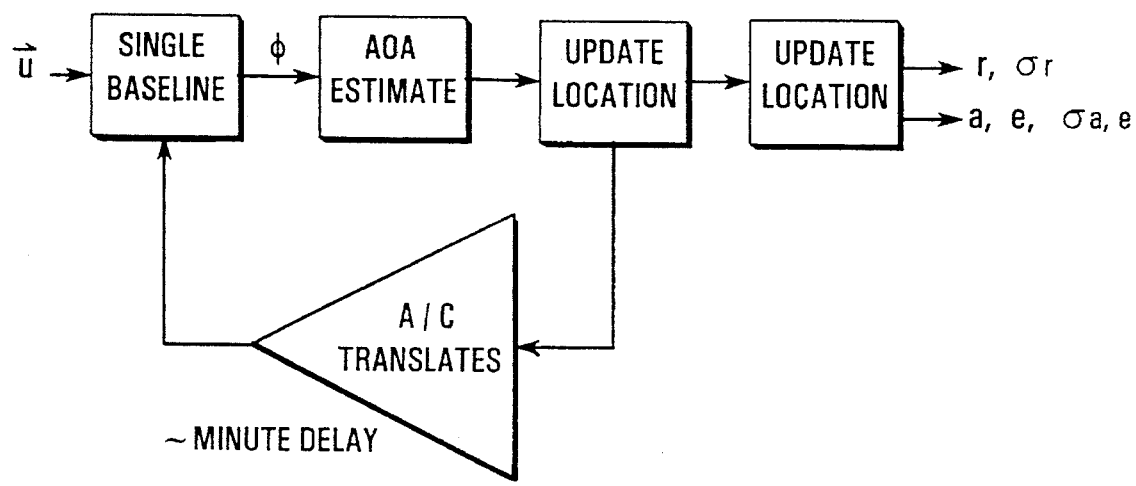
FIG. 3a is a functional/schematic diagram of an exemplary bearings-only linear array measurement system.
Figure 3B:
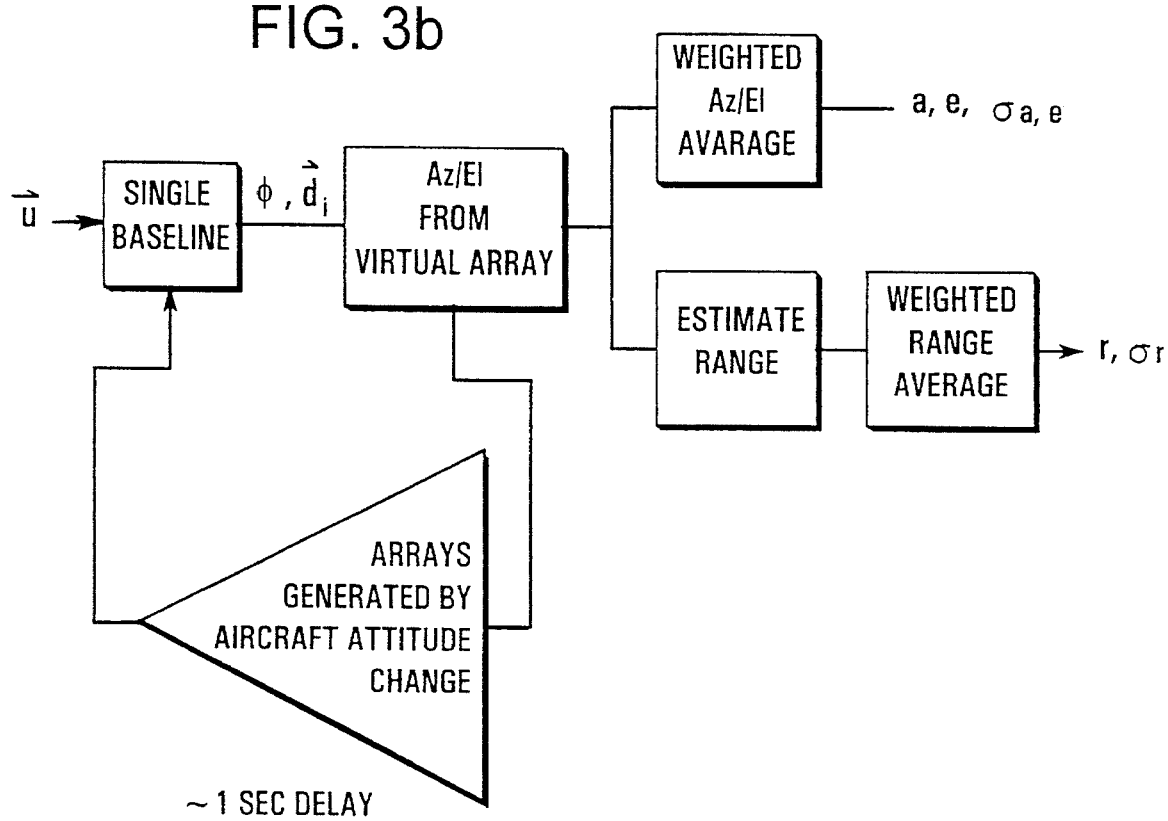
FIG. 3b is illustrative of a virtual array producing system using the invention; the latter two figures being provided to demonstrate the benefits of the invention.

In order to aid an understanding of the principles of the invention, FIGS. 3a and 3b further contrast the two linear interferometer based approaches. The labeled blocks sufficiently identify the sequence of functions. As indicated in FIG. 3b, generating the virtual array involves storing the interferometer 6DOF position at the time the phase measurements are made. This process is iterative, as is the bearings-only approach of FIG. 3a. But the bearings-only iterations extend over minutes to obtain a solution, whereas the virtual array iterations intrinsically require only seconds.

The baselines are formed by combining the two separate resolved linear array phase measurements, the arrays being located on the same platform. This creates a planar array. A virtual array can be created during a single aircraft observer snap roll. This creates a three dimensional array, as does the array created from multiple observers; in the latter case multiple aircraft in close formation can synthesize an array rather than relying on single aircraft attitude changes.

During the course of DF'ing an emitter the virtual array embodied by D can be synthesized from any combination of these four methods. Thus intrinsic system bias errors can tend to random errors in time. For instance, DOA dependent errors randomize with time in the virtual array approach due to the relative change in emitter-to-array angle-of-arrival during a snap roll, compared to conventional az/el location. Thus sequential averaging can be used to reduce both angle-estimate errors, and location-estimate errors.

The averages shown in FIG. 3b that reduce these errors represent both long term and short term averages. The location averaging is long term, extending over many dwells. As just noted, unlike conventional az/el location, the elevations e used to estimate range come from the interferometer array at many different attitudes. Hence the DOA dependent errors on e become random, and hence the range errors are random from update to update. By contrast, the azimuth and elevation estimate average occurs over measurements either close together in time, or observer location. Hence it is typically an average over a small set.

Figures 1A, 1B:
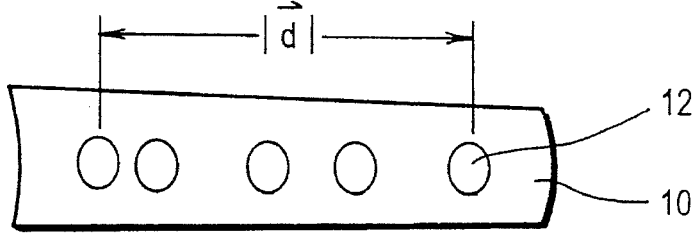
FIG. 1a is a perspective view of a typical prior art linear interferometer array capable of being mounted on the leading edge of an aircraft wing.
FIG. 1b is a schematic-functional diagram of a prior art system using the FIG. 1a linear array to produce AOA measurement.
Figure 4A:
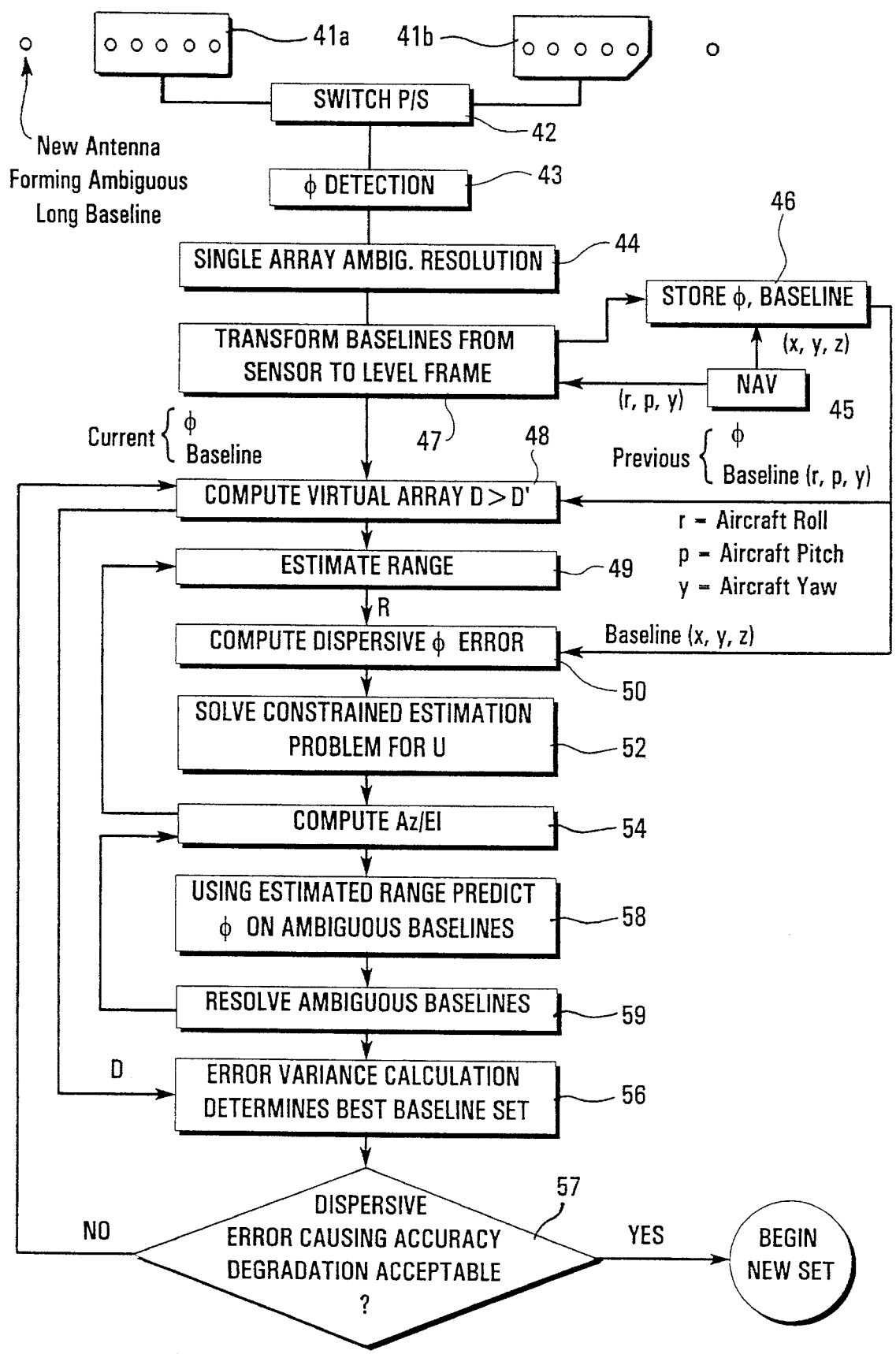
FIG. 4 is a functional/schematic diagram of a system arranged according to the principles of the invention.
Figure 4B:
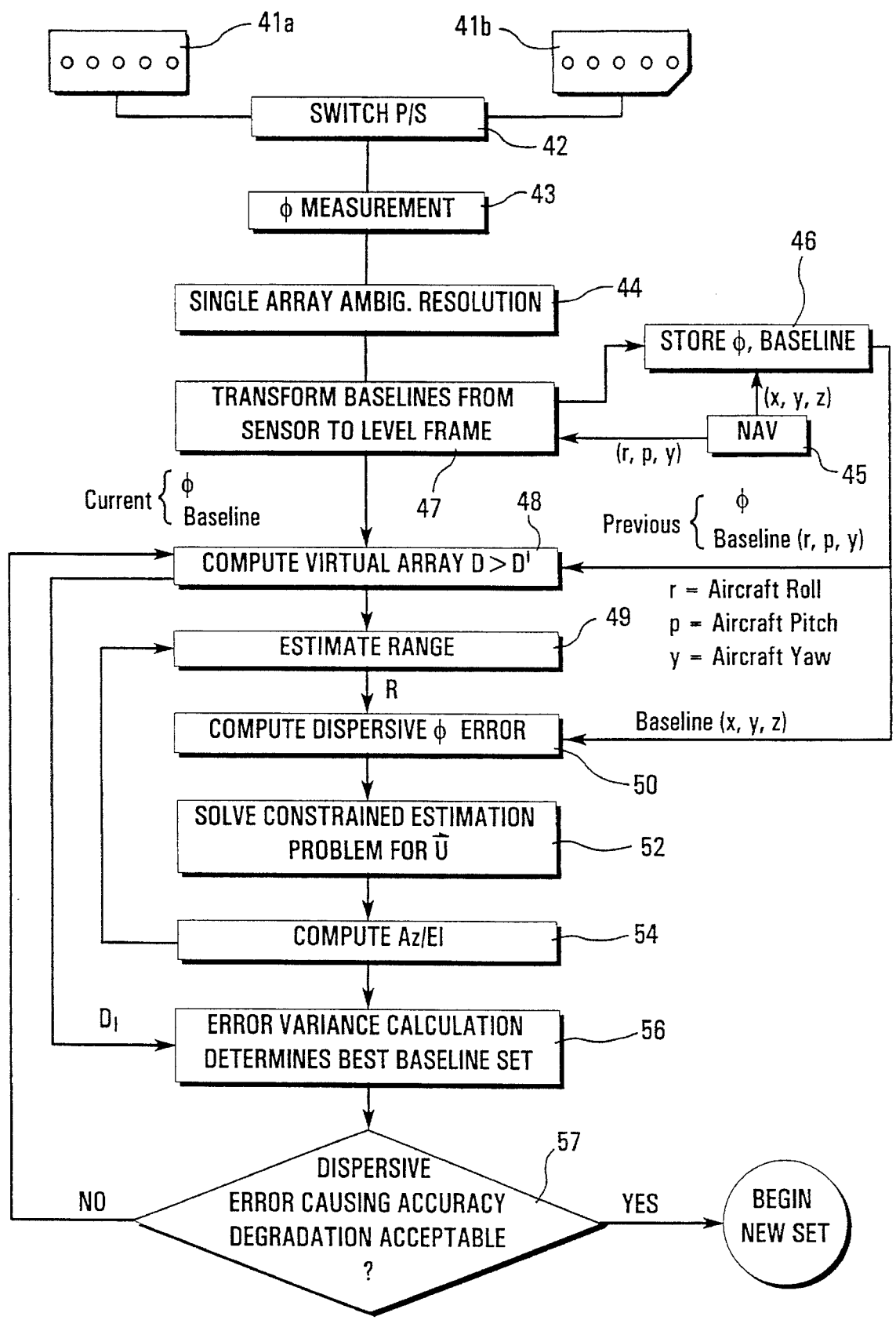

FIG. 4 shows a preferred embodiment of the invention in a system 40 employing two linear interferometers 41a and 41b. The arrays can be constructed like the interferometer pictured in FIG. 1, and located on the leading wing edge of a delta-wing aircraft. The operation is essentially same as that of the conventional system of FIG. 2 through the initial phase measurement ambiguity resolution process 44, but note the absence of the sector decision process. In conventional ESM systems the latter process determines which array will be used. In the new approach presented here all measurements available from all arrays will be used at each dwell.

Utilizing the observer's NAV system 45, the interferometer baseline $d_i$ associated with phase measurement $\phi_i$ are stored in memory 46 with their 6DOF position on the basis of baseline transformations occurring at 47. For example the baselines generated during a snap roll could be $$\text{virbase} = \begin{bmatrix} -.8660 & -.500 & .0000 & .1288 & .0345 & .0000 \\ -.8661 & -.1545 & .4755 & .2576 & .0690 & .0000 \\ -.8660 & .4045 & .2939 & .3864 & .1035 & .0000 \\ -.8660 & .4045 & -.2939 & .5152 & .1380 & .0000 \\ -.8660 & -.1545 & -.4755 & .6440 & .1725 & .0000 \\ -.5000 & .8660 & .0000 & .1288 & .0345 & .0000 \\ -.5000 & .2676 & -.8236 & .2576 & .0690 & .0000 \\ -.5000 & -.70006 & -.5090 & .3864 & .1035 & .0000 \\ -.5000 & -.70006 & .5090 & .5152 & .1380 & .0000 \\ -.5000 & .2676 & .8236 & .6440 & .1725 & .0000 \end{bmatrix}$$

The rows of virbase contain the six parameters required to completely 6DOF characterize the individual baselines. The first three elements in this array are the projections of the baseline unit vector onto the level frame. This projection is done using platform roll, pitch and yaw angles from the navigation, or NAV, system. The second three elements represent the baseline distance from a common reference. The unit is nautical miles for this second set in the example. Thus, a baseline spatial position and attitude for the system is established.

The first five rows of virbase are for the port array, while the second five rows are for the starboard array. The distance apart on the aircraft of the two arrays is too small to be discernible with the numerical precision used here.

The virtual array is constructed sequentially at 48 by iteratively forming the array matrix D. In forming D only the angular orientation of the baselines are used, that is the $d_i$ are all assumed to have a common origin or (x,y,z) location. This common origin is taken as the centroid of all the actual translational positions of the baselines currently forming D. Thus the final array matrix in this example is $$D = \begin{bmatrix} -.8660 & -.500 & .0000 \\ -.8661 & -.1545 & .4755 \\ -.8660 & .4045 & .2939 \\ -.8660 & .4045 & -.2939 \\ -.8660 & -.1545 & -.4755 \\ -.5000 & .8660 & .0000 \\ -.5000 & .2676 & -.8236 \\ -.5000 & -.70006 & -.5090 \\ -.5000 & -.70006 & .5090 \\ -.5000 & .2676 & .8236 \end{bmatrix}$$

However, the solution process begins before the complete array is formed. When two baselines are available an initial D can be formed and checked for "observability", i.e for the feasibility of solving for $\vec{u}$ in the equation $$\phi = \frac{2\pi}{\lambda} |d| Du + \epsilon \quad (7)$$

where the set of phase measurements are collected into a vector $\phi$ whose elements have the same ordering as the baselines. If a solution is feasible the error variance $$R = E(\epsilon \epsilon')$$

on the phase measurements for the virtual interferometer must be computed (50). The dominant error is that caused by the difference in phase at the assumed centroid origin compared to the actual position the phase measurement was made. This error (R) is a function of the emitter location, and hence is not known. The error can be bounded, though, by initially assuming minimum and maximum emitter ranges (49), and using the "dispersion" portion of virbase, which is $$\text{dispbase} = \begin{bmatrix} .1288 & .0345 & .0000 \\ .2576 & .0690 & .0000 \\ .3864 & .1035 & .0000 \\ .5152 & .1380 & .0000 \\ .6440 & .1725 & .0000 \end{bmatrix}$$

Figure 5:
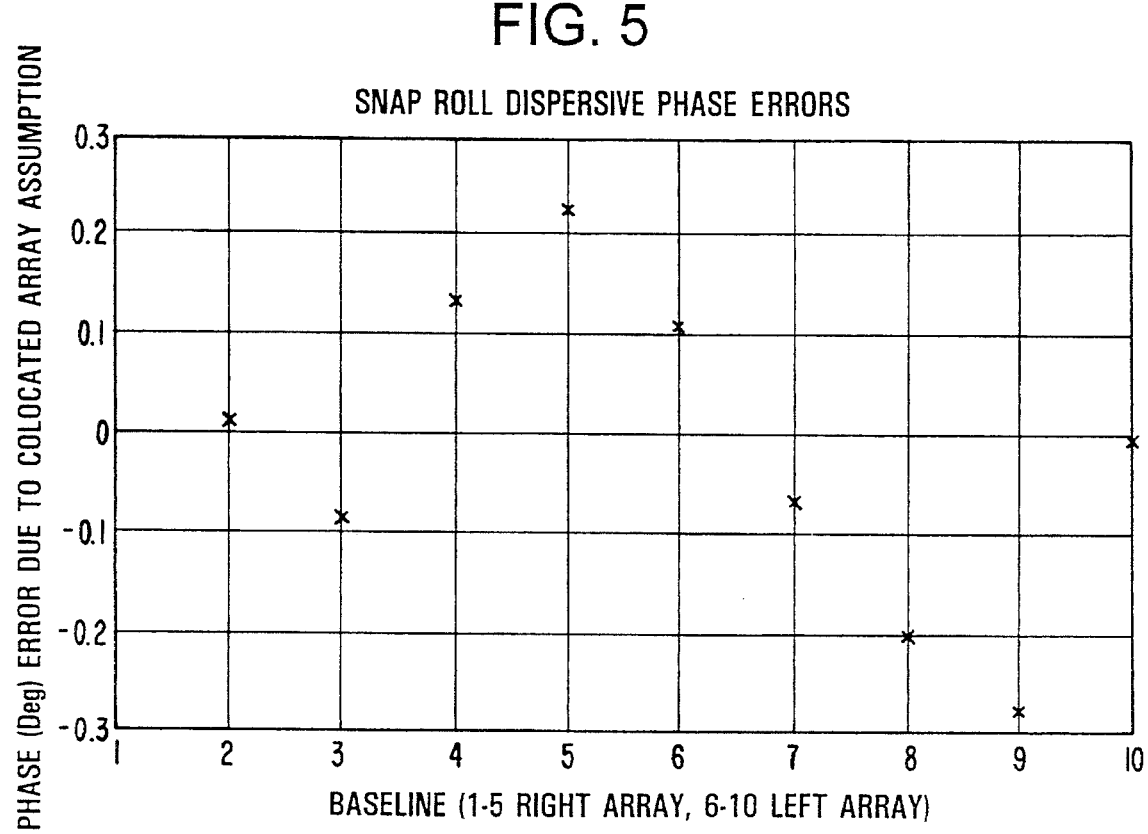
FIG. 5 is a graph plotting dispersive phase error versus baseline when the principles of the invention are applied in a snap roll maneuver.

The last column is zero because there was no altitude change in this example. The phase error actually caused by the different translational positions of the baselines is shown in FIG. 5. In later updates for the same emitter, estimated range is used to refine the bound on the dispersion phase error generated initially from the min/max range assumption. The other component of R is the intrinsic system error occurring in conventional interferometers, i.e. thermal noise and antenna, radome, and receiver bias.

The constrained estimation problem for $\vec{u}$, i.e.

$$J = (\phi - Du)^T R (\phi - Du) \quad (8)$$
$$-1 \leq u_i \leq 1 \quad i = 1, 2, 3$$
$$1 = \vec{u} \cdot \vec{u}$$

is solved next at 52 in the local level frame using, for example, a sequential quadratic programming approach. Azimuth and elevation are computed at 54 from the components of $$u = \begin{bmatrix} u_1 \\ u_2 \\ u_3 \end{bmatrix}$$

according to the definition of the DOA unit vector in Equation 6, i.e by $$a = \arctan\left(\frac{u_2}{u_1}\right)$$

and $$e = \arctan\left(\frac{u_3}{[u_1^2 + u_2^2]^{1/2}}\right)$$

The error variance of this estimate is found next at 56. This is done by noting that the solution to Equation 8 can be written in the form $$u_{est} = D^i \vec{\phi}$$

and $D^i$ is the means by which the relative benefit of using additional or different sets of baselines can be assessed. This is seen by representing the desired azimuth a and elevation e measurements as a vector $$\vec{a} = \begin{bmatrix} a \\ e \end{bmatrix}$$

and finding the error on the estimate of $\vec{a}$, which can be approximated by $$\text{var}(a) = \begin{bmatrix} \frac{\partial a}{\partial u^T} & \frac{\partial u}{\partial \phi^T} \end{bmatrix} R \begin{bmatrix} \frac{\partial a}{\partial u^T} & \frac{\partial u}{\partial \phi^T} \end{bmatrix}^T \quad (9)$$

or $$\text{var}(a) = \begin{bmatrix} \frac{\partial a}{\partial u^T} D^i \end{bmatrix} R \begin{bmatrix} \frac{\partial a}{\partial u^T} D^i \end{bmatrix}^T.$$

Hence the estimate error is strictly a function of $D^i$ and R. $D^i$ reflects the interaction of the relative orientations of the baselines with R, while R embodies predominantly the error introduced by the baseline relative distances apart.

This error variance is used to provide a confidence measure (58) for the estimate, and also when performing a weighted average with future az/el range estimates, or averaging subsequent azimuth and elevation estimates as described below.

This process is repeated with subsequent updates, iteratively forming $D_k$ at the kth update, and estimating $\vec{u}$ until the error variance computation indicates a decrease in accuracy because of increased dispersion from the virtual array centroid. Out of the set of estimates, the one with the smallest error is then saved for subsequent processing and reported as the emitter's DOA. Note that the estimate chosen from a given set may vary depending on the criteria used. For instance, azimuth accuracy may be more important than elevation accuracy, or vice versa.

The estimate associated with a given virtual array centroidal position may be further refined in time if the aircraft is flying a pattern. An example is a racetrack pattern having its long axis oriented toward the emitter, as is commonly done in radar jamming applications. The flight path is a difficult one for bearings-only location, but particularly beneficial for az/el location as performed utilizing the virtual array. This is because as the aircraft repeats the pattern, virtual arrays with sets of phase measurements separated in time by many minutes, but whose centroidal origins are quite close, will be formed. The azimuth and elevation estimates from these independent but nearly collocated virtual arrays can be refined by a weighted average using the error variance estimates, and these smoothed estimates used to produce very accurate az/el location.

If the aircraft is not flying a pattern, collocated virtual arrays will only occur randomly, if at all. The range estimate can still be averaged though, instead of the azimuth and elevation estimates. As the range estimate accuracy improves through averaging, estimated range can be used to refine the computation of the dispersion error in R, which leads to improved DOA estimates for a given set of phase and baseline measurements.

Variations on the above approach are clear. For instance, if a terrain map is available the emitter range estimate can be improved by using virtual array azimuth and elevation coupled with the terrain map. If only azimuth is required from the system and not elevation, after emitter range is found with sufficient accuracy predicted elevation can be used to correct subsequent single baseline AOA to obtain true azimuth.

An intrinsic aspect of this invention is that for each particular class of airframe installations a special set of aircraft maneuvers will produce the best estimates of either azimuth, or elevation, or both together. These maneuvers encompass either a single platform in time, or multiple platforms simultaneously in space. Furthermore, it is clear, particularly for interferometers mounted on the wing's leading edge, that separate, fully resolved interferometer outputs on the same aircraft can be combined during a dwell to locate the emitter, without movement in space or change in attitude required, utilizing the same processing as for multiplatform or attitude-change cases.

For a delta-wing installation, emitters close-in can be DF'd using both wing-mounted arrays in a single dwell with no further 6DOF motion required. For emitters at much smaller elevations, a roll generates very accurate azimuth and elevation. Several aircraft flying close together could produce a similar estimate.

To illustrate these remarks, performance was simulated for an aircraft in level flight, an aircraft snap rolling, and an aircraft in a diving turn (Table I).

TABLE I

Aircraft Maneuvers Used To Generate Virtual Array Performance

| | Aircraft | | | | | Virtual Array | |
|---|---|---|---|---|---|---|---|
| | 480 kts 20000 ft | | | | | No. | Dispersive |
| | Distance | Attitude change | | | | 21" | |
| 6DOF Motion | flown (nm) | roll deg | pitch deg | heading deg | Time | base-lines | error (deg) |
| Level | 0 | 0 | 0 | 0 | 1 msec | 2 | 0 |
| Turn | 2 | 45 | −30 | 57 | 15 sec | 30 | 4.6 |
| Roll | .67 | 360 | 5 | 5 | 5 sec | 5 | .7 |

The emitter characteristics for the three cases is shown in Table II.

TABLE II

Emitter Characteristics Used in Generating Performance

| A/C | Emitter 10 GHz 1 sec Revisit Rate | |
|---|---|---|
| 6DOF Motion | Range (nm) | $SNR_{video}$ (dB) |
| Level | 7.38 | 20 |
| Turn | 50 | 13 |
| Roll | 50 | 13 |

The performance is given in Table III.

TABLE IIIa

Level Flight Virtual Array Performance Contrasted with Conventional AOA System for Emitter at Significant Elevation

| Source | az (deg) | el (deg) | Range (nm) |
|---|---|---|---|
| True | 9.90 | −25.65 | 7.38 |
| Virtual Array Estimate | 9.92 | −25.70 | 6.85 |
| Conventional Linear Array | 12.31 | none available | none available |
| Virtual Array Predicted 1-σ | .15 | .2 | .13 |

TABLE IIIb

Turning Dive Virtual Array Performance Contrasted with Conventional AOA System for Emitter at Small Elevation

| Source | az (deg) | el (deg) | Range (nm) |
|---|---|---|---|
| True | 9.90 | −4.19 | 50.00 |
| Virtual Array Estimate | 9.96 | −5.29 | 39.43 |
| Conventional Linear Array | 10.18 | none available | none available |
| Virtual Array Predicted 1-σ | .74 | .31 | 4.11 |

TABLE IIIc

Snap Roll Virtual Array Performance Contrasted with Conventional AOA System for Emitter at Small Elevation

| Source | az (deg) | el (deg) | Range (nm) |
|---|---|---|---|
| True | 9.90 | −4.19 | 50.00 |
| Virtual Array Estimate | 9.96 | −4.189 | 50.29 |
| Conventional Linear Array | 10.18 | none available | none available |
| Virtual Array Predicted 1-σ | .054 | .023 | .25 |

In all cases the azimuth and elevation accuracy is certainly much greater than would be obtained using the conventional conformal array. The system implementation is also much less complex, while the DOA estimation time takes several, rather than one receiver dwell.

Figure 6:
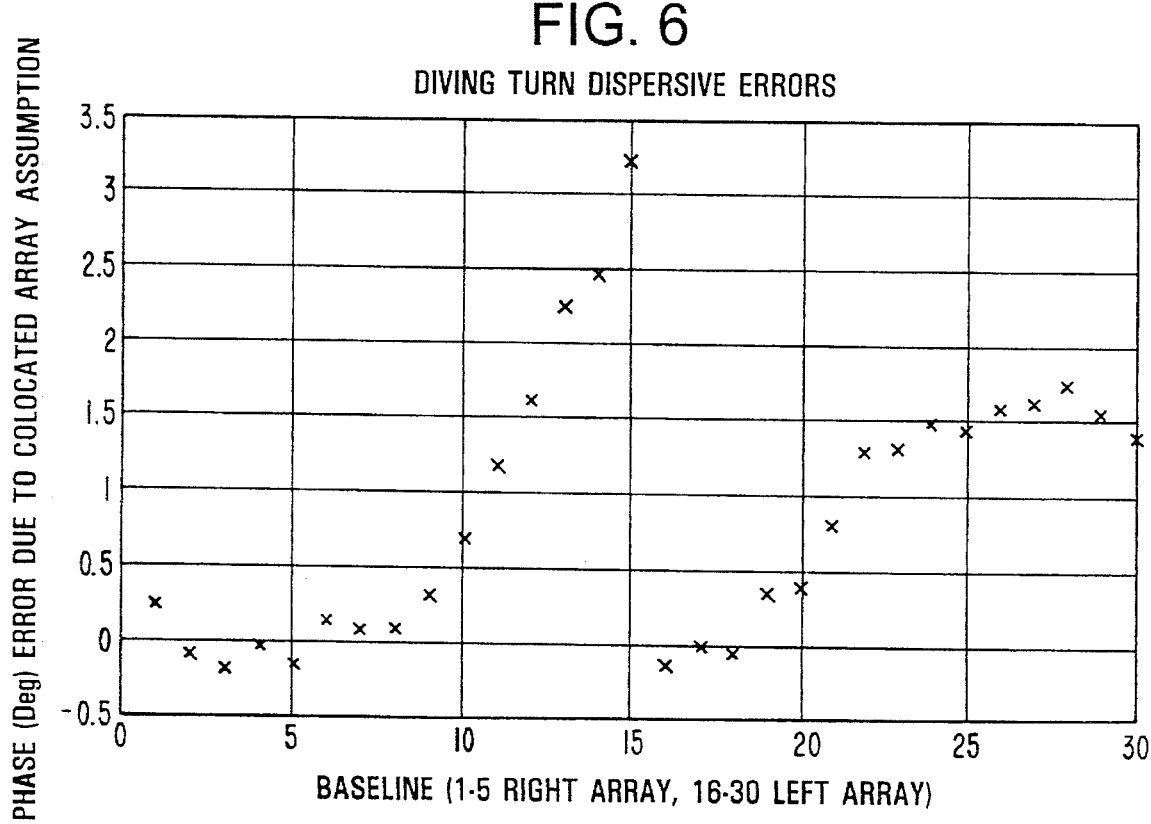
FIG. 6 is a graph providing data like that in FIG. 5 from a diving turn maneuver.

The new phase errors, the dispersive error, intrinsic to this approach are shown in FIGS. 5 and 6 for the snap roll and diving turn. The level flight case had negligible dispersive error. FIG. 5 indicates that the snap roll introduces a dispersive error quite amenable to averaging over the set of baselines. FIG. 6 shows the diving turn introduces more a bias error. However, by varying subsequent maneuvers to change the sign on the error, sequential averaging can be used to reduce its effect on az/el range estimates.

The dispersive error bias for the diving turn case caused the discrepancy between the predicted range accuracy and actual error shown in Table IIIb. The level flight example did not break up the DOA bias error much, which degraded the range estimate from the random-error only accuracy theoretically possible. But, as noted above, the proper set of maneuvers, or single maneuver, can reduce the dispersive and DOA bias and provide range accuracy estimates close to the random-error based theoretical value, as demonstrated by the snap roll in Table IIIc. But note this maneuver set may be different from the set generating the optimal angle estimates, since it will tend to emphasis elevation accuracy over azimuth accuracy.

The principles of this invention are described hereinabove through the description of a preferred embodiment. It is to be understood that the described embodiment can be modified or changed without departing from the scope of the invention as defined by the appended claims.

What is claimed is:

1. In a system for performing direction finding (DF) of an emitter and having only a linear array of interferometer sensors capable of measuring the angle of arrival (AOA) of wave fronts radiating from the emitter, a method of operating the system to correct the AOA measurement from at least one linear sensor array to generate true azimuth, elevation and location in the observer's frame of coordinates, comprising the steps of:

measuring the phase difference between the pairs of antennae forming an interferometer baseline of a wave front from the emitter being located and thereby measuring the unambiguous AOA on fully resolved baselines and ambiguous AOA on fully unresolved baselines;

determining a set of information indicating baseline spatial position and attitude for the system;

storing the resolved phase information and said information indicating the baseline spatial position and attitude;

computing and constructing a virtual interferometer array using the relative angular positions for the stored baseline spatial position and attitude information;

estimating the phase error introduced differing translational positions indicated by the stored baseline spatial position and attitude information;

computing true emitter azimuth and elevation from measured AOA and stored baseline spatial position and attitude to information and phase error estimate information for that AOA measurement;

generating emitter location direction of arrival (DOA) information from the computed emitter elevation and known system attitude;

estimating the range to the emitter;

resolving the ambiguity of AOA measurements on the ambiguous baselines of the array by predicting the phase of those baselines using emitter estimated DOA and estimated range and adjusting the emitter location DOA information in accordance with new resolved baselines and thereby defining range estimate.

2. The method of operating the system described in claim 1 wherein the system includes at least two non-collocated, independent linear sensor arrays on a single platform.

3. The method of operating the system described in claim 1 wherein the system includes at least two non-collocated, independent linear sensor arrays on multiple platforms.

4. The method of operating the system described in claim 3 wherein the multiple platforms are spatially separated, but no minimum distance is required.

5. The method of operating the system described in claim 1 wherein the baseline information is generated by maneuvering an aircraft on which the system is mounted.

6. The method of operating the system described in claim 5 wherein the aircraft maneuvers are changes in attitude rather than translation motion.

7. The method of operating the system described in claim 5 wherein estimated emitter range is used to predict dispersion error and comprising the additional step of selecting a sequential set of aircraft attitude changes on the basis of which set generates the most uncorrelated sequence to sequence error.

* * * * *